Dec. 9, 1958     I. BENIS ET AL     2,863,687
NON SKID SAFETY DEVICE
Filed Dec. 6, 1954
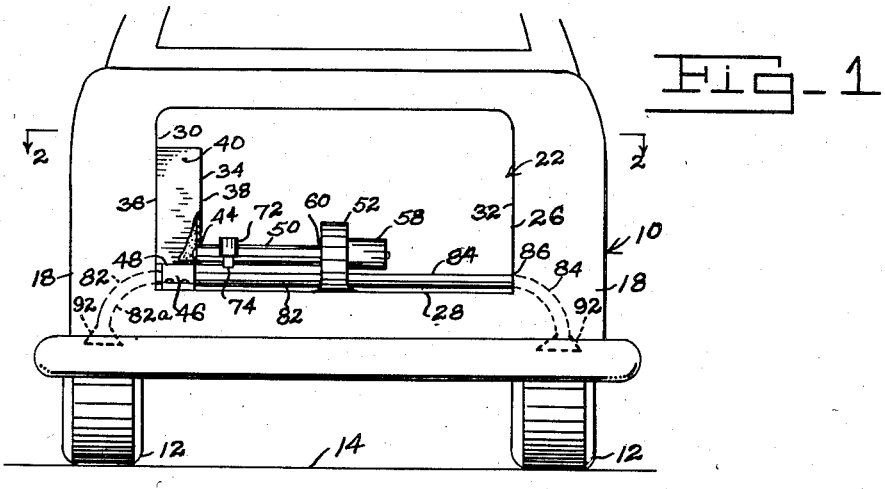
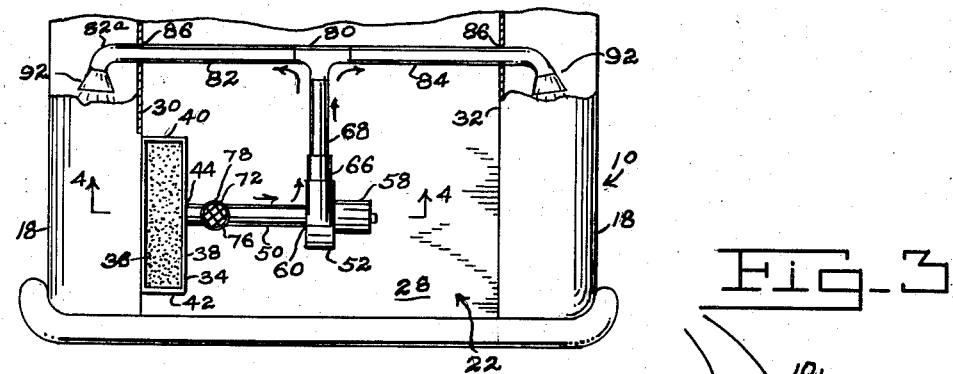
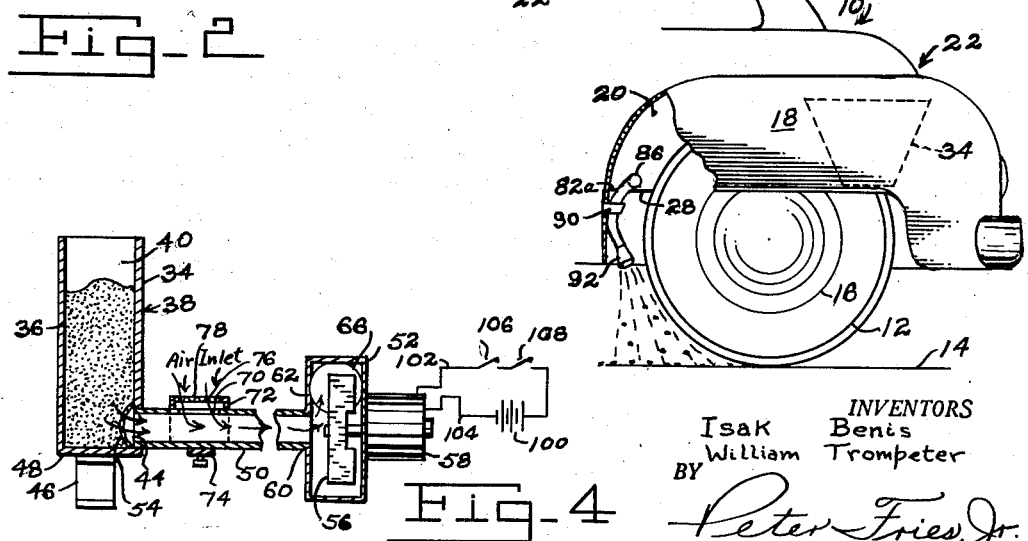
INVENTORS
Isak Benis
William Trompeter
BY Peter Fries, Jr.
ATTORNEY

United States Patent Office 2,863,687
Patented Dec. 9, 1958

2,863,687

NON SKID SAFETY DEVICE

Isak Benis and William Trompeter, Bronx, N. Y.

Application December 6, 1954, Serial No. 473,300

1 Claim. (Cl. 291—3)

This invention relates to improvements in devices for providing and improving traction in vehicles.

An object of the invention is to provide a novel and improved device which may be installed on a motor vehicle or the like, to provide and improve traction of the wheels thereof while in engagement with the ground or pavement upon which the vehicle is moving.

Another object of the invention is to provide a novel and improved non-skid traction aid device which is carried on a motor vehicle or the like, and is arranged to discharge particles which enhance or improve the traction engagement of the wheels or tires of the vehicle with the roadway.

A further object of the invention is to provide a non-skid aid device which has a hopper or other container of suitable particles of matter which are to be employed in enhancing traction engagement of the tires of a vehicle with the roadway, and including means for drawing particles from said hopper, and for casting them into the path of movement of the tires, and/or upon the tires, so that their presence increases the engagement of the tires with the roadway, and lessens slippage therebetween.

Still another object of the invention is to provide a novel and improved non-skid device in which there is a hopper containing finely divided material such as sand, ground ashes, salt, or other materials, or a combination thereof, with one or more ducts leading from the hopper to discharge nozzles arranged and oriented in proximity to the path of movement of the tires, and including motor driven suction means for drawing said particles from the hopper and with a considerable degree of force, impelling them through said duct and out through said discharge nozzles, whereby the frictional engagement of the tires with the roadway is improved, and skidding avoided.

Still a further object of the invention is to provide a novel and improved non-skid device of the character described, which includes switch means in the circuit of the fan impeller motor, so that depression of the foot brake pedal of the vehicle, actuates the impeller motor, and causes the particles to be discharged either into the path of the tires, and/or upon them.

Another object of the invention is to provide a novel and improved non-skid aid device of the character described, which is simple in design, inexpensive to manufacture, has few parts and is very effective in use, for its intended purposes.

A further object of the invention is to provide a novel and improved device of the character described, which may be either furnished as an integral part of a new motor vehicle, or may be installed readily and simply in any motor vehicle, and which requires a minimum of space for its operative parts.

These and other objects and advantages of the invention will become apparent from the following description of a preferred embodiment thereof, as illustrated in the accompanying drawings, and in which, Figure 1 is a fragmentary rear elevational view showing a motor vehicle with the non-skid device installed in the trunk compartment, the trunk compartment door being omitted from the view for clarity of illustration.

Figure 2 is a fragmentary sectional plan view taken substantially on plane 2—2 of Figure 1, and further partly broken out to show the exit and disposition of the ducts leading to the discharge nozzles.

Figure 3 is a fragmentary left side elevational view of the motor vehicle shown in Figure 1, a portion of a fender being broken out also to show the construction thereunder.

Figure 4 is a sectional elevational view taken substantially on plane 4—4 of Figure 2, the sand hopper being shown partly filled with sand or the like.

Another object of the invention is to provide a non-skid device whereby it is unnecessary to use either skid-chains on the existing tires, or to use snow tires, with their enlarged tread projections.

In the operation of motor vehicles with their pneumatic rubber tires, it is most important to be able to bring the vehicle to a halt quickly and safely when needed. This is not always possible, especially when the roads are wet, covered with ice and snow, or mud, and also when the material of which the road is made is subject to slippage under any but the most dry conditions. The present device makes it possible to increase the traction and frictional engagement of the tires of the vehicle with the roadway, so as to permit more ready stopping of the vehicle, and also to permit it to proceed and to accelerate quickly under what would be considered adverse road conditions.

It is adapted to discharge upon the road surface, small particles of matter, such as sand, ashes, furnace wastes, cinders, salt, or a mixture or combination of these and or other materials, and even earth when the others are not available, the materials being stored in a hopper in the vehicle, such as in the trunk, and intermixed with an air stream and discharged into the path of the wheels, or in fact directly under the wheels, so that their traction is enhanced and skidding avoided.

In order to understand clearly the nature of the invention, and the best means for carrying it out, reference may now be had to the drawings, in which like numerals denote similar parts throughout the several views.

As shown, there is a motor vehicle, such as seen at 10, which may be a passenger vehicle, ambulance, taxicab, truck, station wagon or other such vehicle, provided with tires as at 12, engaging the ground or roadway 14. The tires may rotate on their wheels 16 on suitable axles, in any well known manner, and may have fenders 18 covering the wheels and defining fender recesses 20 in which the wheels and tires are disposed.

The vehicle body may have a rear trunk 22 for carrying articles or the like, the trunk usually having a door fitted hingedly into the trunk opening 26, to afford access to the interior thereof as needed, the door being omitted from the views for clarity only. The trunk thus may have a floor 28 or trunk deck, disposed between side walls 30 and 32 of the fenders or body of the car, depending upon the type of construction employed, and this trunk deck thus serves as a convenient place to support the working parts shown in the views. However it not to be supposed that this is the only place of such support, as they may be disposed elsewhere, in any convenient place.

As shown, we provide a hopper or container 34 which may have a pair of side walls 36 and 38 spaced by and inter-connected by end walls 40 and 42, the end walls being preferably downwardly convergent, as seen in broken lines in Figure 3, so that they converge at the discharge outlet 44 of the hopper. A bracket 46 may be employed to support the floor wall 48 of the hopper above the deck 28 of the car trunk, or suitable legs may be used also. A pipe or duct 50 is inserted in the discharge opening 44 of the sand hopper 34, to conduct the contents of the hopper through the pipe 50 in a rightward direction as seen in Figures 1, 2 and 4, to the centrifugal fan housing 52. As seen in Figure 4, a guard cover or shield 54, made in the form of a small dished or spherical member of wire mesh sufficiently open to allow the particles being used to pass therethrough, yet to avoid blocking the opening to pipe 50 unduly, may be fixed to the inner side of the discharge opening of the hopper 38, so that the particles can pass therethrough under the suction of the airstream induced by the rotation of the blades 56 of the centrifugal fan 52. A motor 58 may be mounted on the fan housing so that its shaft will turn the impeller blades of the fan 52, thus inducing an air stream which enters axially at the rightward end 60 of the pipe 50, the wall 62 of the fan housing being provided with an axial opening to receive it. The impeller blades rotate in such a direction as to eject the air stream through its peripheral discharge outlet 66 in the usual manner of a centrifugal pump, and into the pipe 68 in the direction shown by the arrow.

An air intake opening 70 is formed through the pipe 50, as shown in detail in Figure 4, to allow air to be suctioned into the pipe 50 to form a good strong air stream aiding in inducing sand to be drawn from hopper 38 and to the fan housing 52, for discharge through pipe 68, as an air-sand intermixture, that is, with the sand particles entrained in the strong air stream. To protect the air induction opening 70, we provide an air induction protective cap 72 which may be cylindrical, and supported in snug fit on the pipe 50, by means of an encircling strap 74 or clamp. The upper end of the cap 72 is provided with an opening 76 covered with a wire mesh disc 78 allowing air to enter without permitting other unwanted debris to enter.

At the outer end of the connecting pipe 68, we provide a T-coupling 80 to connect with divergent branch pipes 82 and 84, which extend through openings 86 formed through the side walls 30 and 32 of the trunk compartment, emerging, as seen best in Figures 2 and 3, in the fender wells 20 where the tires are disposed and rotate. As seen in Figure 3, the outer ends 82a of the pipes such as 82 and 84, may be formed of flexible material easily curved as seen, and clamped by clamp 90 to the interior wall of the fender, with their lower ends covered with a spray discharge nozzle 92 suitably oriented as desired, either directioned to discharge the sand upon the ground immediately in front of each tire, as shown in Figure 3, or aimed upon the lower left portion of the tire which is about to engage the road surface 14, or aimed into the angular space between the lower left portion of the tire and the road itself, so that some sand impinges upon the tire, some on the road, and some in the angular space therebetween.

The motor 58 may be of a type wound to run on the usual automobile battery, such as for six or twelve volts, and should be of a normal high rotational speed. It has been found that where sand is used, a fan speed of about 5000 revolutions per minute and upwards is very favorable and efficient in use, and in fact, the higher the better, within limits, such as explained. As shown in Figure 4, the motor may be connected to the battery 100 by means of wires 102 and 104, with switches 106 and 108 preferably connected in the series circuit. The switch 106 may be of the well known types which are connected by a pull cable or the like, to the brake pedal actuated by the foot of the driver when he seeks to halt the car, the depression of the brake pedal closing the circuit to the battery as by closing switch 106, and turning on the fan to discharge pellets or sand onto the road. The on-off switch 108 may be mounted on the dashboard of the car, so that when the road is dry, the depression of the brake pedal does not turn on the sanding device. It is understood that the hopper 38 may be filled with sand, ashes, cinders, salt, or other suitable materials or a combination or mixture thereof.

Although the invention has been described in specific terms, it will be understood that various changes may be made in size, shape, materials and arrangement without departing from the spirit and scope of the invention as claimed. The hopper 38 may also be made separable, so that several filled hoppers may be carried in the car, containing differing mixtures to meet differing conditions.

We claim:

A non-skid particle dispensing device comprising an upwardly open hopper for containing particles to be dispensed, and having a discharge outlet at a lower portion thereof, a delivery duct engaging at one end said discharge outlet for receiving particles therefrom, a fan housing connected to another end of said delivery duct, a fan in said fan housing, motor means connectable to a power source for rotating said fan so as to induce suction in said fan housing and in said delivery duct, supplementary air induction intake means constructed and arranged in said delivery duct intermediate its ends for allowing air induction into said delivery duct and said fan housing upon operation of said fan and for inducing movement of particles from said hopper through said delivery duct into said fan housing, the said fan being constructed and arranged with impeller blades engageable with said particles as they enter said fan housing, discharge pipe means connected at one end to said fan housing for receiving said particles as they are engaged by said fan impeller blades and impelled thereby out of said fan housing into said discharge pipe means, and discharge nozzle means connected to said discharge pipe means for discharging said particles under the ultimate impulsion of said fan impeller blades.

References Cited in the file of this patent

UNITED STATES PATENTS

| | | |
|---|---|---|
| 1,294,929 | Mahoney et al. | Feb. 18, 1919 |
| 1,380,964 | Hopkins | June 7, 1921 |
| 1,497,198 | Sherwin | June 10, 1924 |
| 1,541,159 | Maccallum, Jr. | June 9, 1925 |
| 1,842,506 | Brueggeman | Jan. 26, 1932 |
| 2,033,322 | Boyer et al. | Mar. 10, 1936 |
| 2,672,361 | Werbe | Mar. 16, 1954 |